United States Patent [19]

Bergen

[11] Patent Number: 4,510,528
[45] Date of Patent: Apr. 9, 1985

[54] SMEAR REDUCTION FOR A TELEVISION PICKUP

[75] Inventor: Franciscus H. M. Bergen, Eindhoven, Netherlands

[73] Assignee: U.S. Philips Corporation, New York, N.Y.

[21] Appl. No.: 407,674

[22] Filed: Aug. 12, 1982

[30] Foreign Application Priority Data

Sep. 4, 1981 [NL] Netherlands ............... 8104103

[51] Int. Cl.³ .................................... H04N 5/34
[52] U.S. Cl. ............................. 358/213; 358/163
[58] Field of Search ............ 358/213, 241, 163, 167

[56] References Cited

U.S. PATENT DOCUMENTS

| 4,010,319 | 3/1977 | Levine | 358/213 |
| 4,058,836 | 11/1977 | Drewery et al. | 358/167 |
| 4,237,488 | 12/1980 | Takemura | 358/163 |

FOREIGN PATENT DOCUMENTS

| 56-12179 | 2/1981 | Japan | 358/213 |
| 56-12178 | 2/1981 | Japan | 358/213 |

Primary Examiner—Gene Z. Rubinson
Assistant Examiner—Robert G. Lev
Attorney, Agent, or Firm—Marc D. Schechter

[57] ABSTRACT

A television pickup arrangement comprises a solid state pickup device which is read by field transfer. The pickup produces a picture signal which on display shows information smear. It is known to perform a correction by obtaining signal smear information from under an opaque, masking strip on the picture pickup portion of the pickup device. The smear picture signal is stored once in every field period in a memory device which is repeatedly readable at line frequency. The smear picture signal is subtracted from the picture signal to be corrected.

If there is movement in the scene in the horizontal direction, an unacceptable smear is, however, still observable. According to the invention, a correction may be effected, using a second memory device. The second memory device may be used for performing a signal averaging operation over several field periods or for storing a smear picture signal so that different smear corrections can be effected in the upper and lower picture halves. In both cases the smear is reduced to an acceptable level.

7 Claims, 17 Drawing Figures

U.S. Patent  Apr. 9, 1985  Sheet 1 of 3  4,510,528
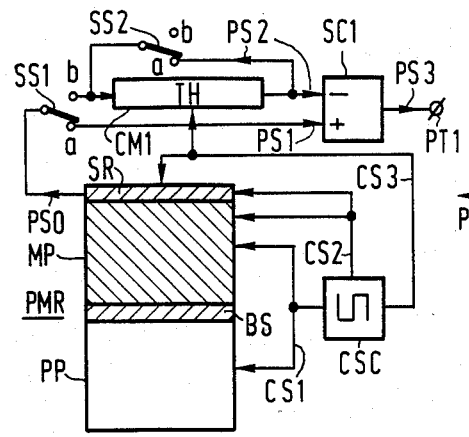
FIG.1 (PRIOR ART)
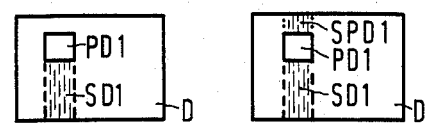
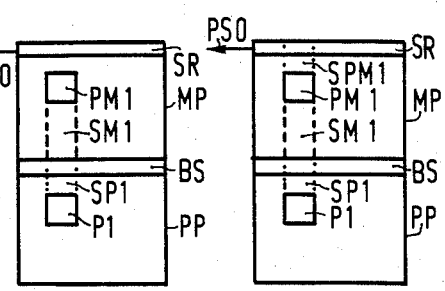
FIG.2a (PRIOR ART)  FIG.2b (PRIOR ART)
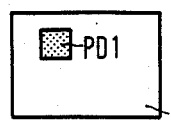
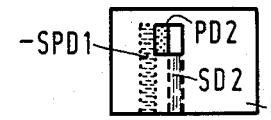
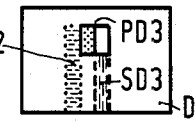
FIG.3 (PRIOR ART)  FIG.4a (PRIOR ART)  FIG.4b (PRIOR ART)
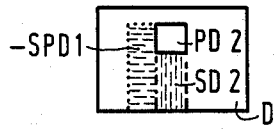
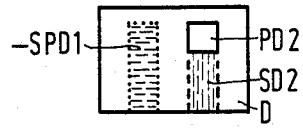
FIG.5 (PRIOR ART)  FIG.6 (PRIOR ART)

SMEAR REDUCTION FOR A TELEVISION PICKUP

BACKGROUND OF THE INVENTION

The invention relates to a television pickup arrangement having a solid state pickup device. The pickup device has a picture pickup portion, a field memory portion coupled to the pickup portion and a parallel-in series-out output shift register coupled to the field memory portion for producing a picture signal at a register output. The pickup arrangement also includes a clock signal circuit for controlling the picture pickup device according to a field transfer system, and a correction arrangement for reducing signal smear which is produced when the signal is transferred from the picture pickup portion to the field memory portion.

The correction arrangement has a memory device. This memory device is repeatedly readable with a repetition period equal to a television line period. The memory device stores a smear picture signal to be applied once during every television field period in a field blanking period via a changeover switch. The smear picture signal comprises signal smear information received from under an opaque strip provided on the picture pickup portion. The correction arrangement also includes a signal combining circuit having two inputs and an output. The inputs are coupled to the output of the output shift register and to the memory device, respectively. The output of the combining circuit is intended to supply the corrected picture signal at an output terminal of the pickup arrangement.

Such a television pickup arrangement is disclosed in U.S. Pat. No. 4,010,319. The signal smear is corrected by subtracting (in the signal combining circuit) the smear picture signal, containing smear information received from under the opaque strip provided on the pickup portion, from the picture signal corresponding to the scene image on the picture pickup portion. This signal subtraction operation is performed with one specific smear picture signal for every line scanned in a field scanning period.

The correction arrangement for reducing the signal smear is most effective when no moving portions are present in the scene to be televised or if there is only movement in the scene is in a direction which corresponds to the direction of the signal transfer from the picture pickup portion to the field memory portion. This signal transfer direction is transverse to the television line scanning or horizontal direction and consequently is in the vertical (field scanning) direction. It has been found that in practice when the known correction arrangement is used, there is still an annoying signal smear still occurs on display of the picture signal if one or more bright portions are present in the scene moving in the direction of line scan or in the opposite direction, that is to say in the horizontal direction.

SUMMARY OF THE INVENTION

It is an object of the invention to provide a correction arrangement for a television pickup arrangement for producing a picture signal which on display has no annoying, observable, unacceptable signal smear in scene portions moving in the horizontal direction.

According to the invention, a correction arrangement for reducing smear includes delay means, comparator means, and signal averaging means. The delay means supplies an output signal which is equal to the corrected television picture signal after a delay of one field period. The comparator means measures the difference between the raw television picture signal and the delayed corrected television picture signal. The comparator means produces a first output signal if the measured difference exceeds a preselected threshold value, and produces a second output signal if the measured difference is less than the preselected threshold value.

Finally, the signal averaging means produces a corrected output signal in response to the output of the comparator means. The corrected output signal is equal to the raw television picture signal if the output of the comparator means is the first output signal. The corrected output signal is equal to a weighted average of the raw television picture signal and the delayed corrected television picture signal if the output of the comparator is the second output signal. The corrected output signal from the signal averaging means is the corrected television picture signal with reduced smear.

According to a second aspect of the invention, a correction arrangement for reducing smear comprises two storing means and two subtracting means. The first storing means stores a first smear picture signal from a first television field. The second storing means stores a second smear picture signal from a second television field which immediately follows the first television field.

The first subtracting means subtracts the first smear picture signal from the first half of the raw television picture signal of the second television field to produce a first difference signal. The first difference signal is the first half of the corrected television picture signal.

The second subtracting means subtracts the second smear picture signal from the second half of the raw television picture signal of the second television field. This second difference signal is the second half of the corrected television picture signal.

Further features of the invention will be described, below.

The correction arrangement according to the invention is advantageous because it can be integrated in a semiconductor body.

BRIEF DESCRIPTION OF THE DRAWING

FIG. 1 is a block schematic circuit diagram of the prior art television pickup arrangement comprising a correction arrangement.

FIGS. 2a and 2b schematically illustrate the signal smear effect on display of a picture signal generated by a television pickup arrangement without the prior art correction arrangement.

FIG. 3 schematically illustrates the effect of the prior art correction arrangement on display of a scene without moving scene portions.

FIGS. 4a and 4b schematically illustrate a smear effect observable on a display when there is a scene portion moving in the horizontal direction, and when the picture signal is generated by the prior art correction arrangement.

FIG. 5 also schematically illustrates a smear effect, but this time associated with a faster, more prolonged movement than assumed for FIGS. 4a and 4b.

FIG. 6 schematically illustrates a smear effect at a still faster, more prolonged movement than assumed for FIG. 5.

DESCRIPTION OF THE PREFERRED EMBODIMENTS

Figure 7:
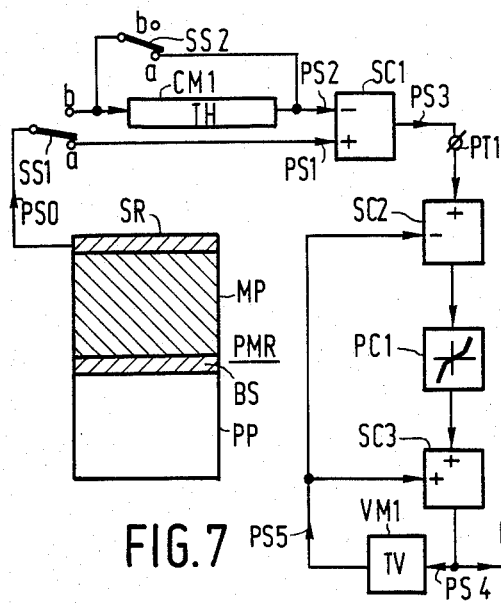
FIG. 7 is a block schematic circuit diagram of an embodiment of a television pickup arrangement according to the invention comprising a correction arrangement for reducing signal smear for scene portions moving in the horizontal direction.

In the prior art television pickup arrangement shown schematically in FIG. 1, PMR denotes a solid state picture pickup device. The picture pickup device PMR has a picture pickup portion PP, a field memory portion MP coupled to the pickup portion, and a parallel-in, series-out output shift register SR coupled to the field memory portion MP.

An opaque strip BS is provided on the picture pickup portion PP. The entire memory portion MP and the entire shift register SR are also shielded from light.

Light coming from a scene, not shown, is projected onto the picture pickup portion PP. The light produces, in the unshielded portion, after a light integration interval, a charge image corresponding to the scene. Under the control of a clock signal CS1 produced by a clock signal circuit CSC, the charge image is now shifted according to the known field transfer system from the picture pickup portion PP to the field memory portion MP. In practice, this shifting operation is effected during, for example, 10 television line periods TH in a field blanking period TVB.

Thereafter the shifted change image is present in the field memory portion MP and the shift register SR. In the subsequent field scanning period TVS (which together with the field blanking period TVB forms a field period TV), the memory portion is read out. The shift register SR is serially read out during line periods TH in a line scanning period THS. The shift register is then filled in parallel from the field memory portion MP in the next line blanking period THB. For these purposes the circuit CSC produces the clock signal CS2 for filling the shift register SR and a clock signal CS3 for the reading operation. As a result thereof, there appears at the output of the shift register SR a picture signal PS0. Signal BS0 contains information which corresponds to the charge image obtained as an image of the scene followed by information which corresponds to charge under the opaque strip BS.

On display, of the picture signal PS0 an effect is produced which is illustrated by FIGS. 2a and 2b. In FIGS. 2a and 2b, D denotes a display screen which is part of a display device, not shown, to which the picture signal PS0 is applied for display. For the sake of completeness it should be noted that on record display the line and field scanning directions are opposite to those used on recording. This is caused by the described field transfer method during picture signal generation.

Let it be assumed that the scene has a stationary scene portion P1 which is schematically shown as a square in the charge image in the picture pickup portion PP. After a light integration period, the information is shifted from the picture pickup portion PP to the memory portion MP and the shift register SR.

During the shift period (10 TH), the light integration continues. This results in the recording of information, shown in FIG. 2a, in the memory portion after the end of the light integration. PM1 designates the information corresponding to the scene portion P1. The light integration which continues during the shift period (10 TH) results in a smear which is designated by SM1 in the memory portion MP and by SP1 in the pickup portion PP.

Repeated display of the resulting picture signal PS0 results in the picture shown in FIG. 2a on the display screen D. The information PM1 and the smear SM1 are represented on the screen D by PD1 and SD1. For simplicity, it is assumed that the information received from under the black strip BS is not displayed on the screen D. The brightness of the smear SD1 corresponds to a light integration period equal to a shift period (for example equal to 10 TH). The brightness of the information PD1 corresponds to a light integration period equal to approximately one field period (for example 302.5 TH or 252.5 TH in a television standard having an interlaced 625 or 525-line raster). As a result, the smear SD1 has a brightness which is 3 to 4% of the brightness of the information PD1.

FIG. 2a relates to a nonrecurrent picture recording. In television, repeated picture recording takes place and the display shown in FIG. 2b is associated therewith. The smear SP1 obtained in a given field period (FIG. 2a) results in a smear SPM1 in the next field period (FIG. 2b). On repeated display of the resulting picture signal PS0 the information PD1 and smears SD1 and SPD1 are present on the display screen D of FIG. 2b.

In order to eliminate the smear from the picture shown on the display screen D of FIG. 2b, the prior art pickup arrangement of FIG. 1 comprises a correction arrangement. The correction arrangement is connected to the output of the shift register SR and has two changeover switches SS1 and SS2, a delay device CM1 having a time delay equal to one line period TH, and a signal combining circuit SC1. The black strip BS present on the picture pickup portion PP also forms part of this correction arrangement.

The output of the shift register SR, which carries the picture signal PS0, is connected in the correction arrangement (BS, SS1, SS2, CM1, SC1) to a switching contact of the changeover switch SS1. Switch SS1 has a first selection contact a and a second selection contact b. (For simplicity the switch SS1, and also the switches SS2, SS3 etc., still to be described, are shown in the drawing as mechanical switches. In practice, these switches will be electronic switches to which switching signals are applied.) The selection contact a of the switch SS1 is connected to a (+) input of the circuit SC1. The selection contact b of the switch SS1 is connected to a signal input of the device CM1 and to the switching contact of the switch SS2.

A clock signal input of the device CM1 receives the clock signal CS3 from the clock signal circuit CSC. The output of the device CM1 is connected to a (−) input of the circuit SC1 and to a first selection contact a of the switch SS2. A second selection contact b of switch SS2 is not interconnected. The changeover switch SS2 is then operated as an on/off switch. The output of circuit SC1 is connected to an output terminal PT1 of the pickup arrangement of FIG. 1. Terminal PT1 is the output of the prior art correction arrangement (BS, SS1, SS2, CM1, SC1).

For the operation of the prior art correction arrangement (BS, SS1, SS2, CM1, SC1) of FIG. 1 it follows that when the smear information SP1 coming from under the black strip BS is present at the output of shift register SR as information SPM1 (FIG. 2b), the switches SS1 and SS2 are connected to selection contacts b. The information SPM1 is then shifted into the device CM1 during the line scanning period THS. In the next link blanking period THB the shift register SR is filled from the memory portion MP, while the switches SS1 and SS2 are switched to the selection contacts a. In the subsequent line scanning period THS the picture signal PS0 is directly applied to the (+) input of the circuit SC1, the (−) input of which receives the output signal from the device CM1. The output signal of CM1 is also applied to the input of CM1.

In the line scanning periods THS subsequent thereto, during the field scanning period TVS the cycle is repeated. The selection contacts a are connected to the switching contacts. At the (+) input of the circuit SC1 the picture signal PS1 is provided which thus corresponds to the information obtained in the picture pickup portion PP outside the black strip BS. Provided on the (−) input of the circuit SC1 is the picture signal PS2, which corresponds to the smear information SPM1 (FIG. 2b) which is always repeatedly read in the field scanning period TVS. The delay device CM1 and the switch SS2 then form a repeatedly readable memory device (CM1, SS2) having a repetition period equal to one television line period, and being in the form of a line circulating memory.

As a result thereof, the output PT1 is a picture signal $PS3 = PS1 - PS2$. On display, picture signal PS3 produces the picture shown in FIG. 3 on the display screen D. It appears that compared with the picture on the screen D of FIG. 2b, the smears SPD1 and SD1 are eliminated. The brightness of the information PD1 of FIG. 3 is 3 to 4% less than the brigtness of FIG. 2b, which is shown in FIG. 3 by means of dots.

The described prior art correction arrangement is most effective when no moving portions are present in the scene to be televised or if there is only movement in the scene in the vertical direction. The smear information SPM1 coming from under the black strip BS is then hardly influenced and the smear picture signal PS2 matches the picture signal PS1 to be corrected. This does not hold for a scene portion containing a movement component in the horizontal direction.

FIGS. 4a and 4b show the case in which the scene portion P1 (FIG. 3) is moving in the horizontal direction. FIG. 3 is the starting point and it is assumed that after the field transfer in the shift period 10 TH the scene portion P1 has moved, in a period of time which is so short as to be disregarded, to a position at which the scene portion P2 is shown. After the following shift has ended, the result at the end of the shift period 10 TH is shown in FIG. 4a in the picture pickup device PMR. The smear SP1 of FIG. 3 is now located at SPM1 of FIG. 4a. Furthermore, the information PM2 and the smears SM2 and SP2 are shown in the picture pickup device PMR of FIG. 4a.

Display of the information present in the memory portion MP of the picture pickup device PMR of FIG. 4a after the smear correction according to FIG. 1 has been effected, results in the picture which is shown on the display screen D of FIG. 4a. The result is based on the picture displayed on the screen D of FIG. 2b. At the top of the screen, the smear information SPM1 of FIG. 4a results in the proper correction of the smear SPD1 (FIG. 2b). Below the left half of SPM1 the signal subtraction in the circuit SC1 results in a smear −SPD1. At the left half of PD2 in FIG. 4a the smear information SPM1 is subtracted from the information PD2. Below the left half of PD2, this smear information compensates for the smear SM2. At the right half of PD2 in FIG. 4a, nothing is subtracted from the information PD2. Below the right half of PD2 the smear SD2 appears. A comparison between the pictures on the screens D of FIGS. 3 and 4a clearly shows the smear on display when there is a scene portion which moves in the horizontal direction.

In the same manner that FIG. 4a is derived from FIG. 3, FIG. 4b is derived from FIG. 4a. The scene portion P1 has moved in a jerky manner, via P2, to the region of the scene portion designated by P3. The smear SP2 of FIG. 4a then results in the smear information SPM2 of FIG. 4b. The result is a picture on the screen D of FIG. 4b wherein the smears −SPD2 and SD3 occur.

FIG. 5 illustrates the smear effect associated with a faster movement than assumed for FIGS. 4a and 4b. Starting from FIG. 3, it is assumed that, in the manner described for FIG. 4a, the jerking movement of the scene-portion P1 leads to P2. The information PD2 on the screen D of FIG. 5 is now not influenced by the smear information SPM1 which further results in the smear −SPD1 on the screen D. The smear SM2 is now fully displayed on the screen D as the smear SD2.

FIG. 6 illustrates, starting from FIG. 3, the smear effect associated with a still faster movement than assumed for FIG. 5. On the screen D of FIG. 6 the smears −SPD1 and SD2 now appear separate from each other.

In practice, the signal smears illustrated by means of FIGS. 4a, 4b, 5 and 6 appear to be annoying on display in scene portions moving in the horizontal direction or having a movement component in that direction. For simplicity, it has been assumed that the movement proceeds with jerks. However, smooth movements also produce annoying signal smear on display.

Smear could be fully eliminated by providing in the optical path between the scene and the picture pickup device PMR a mechanical rotary shutter which blocks the light during the charge transfer period which has a duration of 10 TH. It is then not necessary to use the correction arrangement (BS, SS1, SS2, CM1, SC1) described with reference to FIG. 1. In practice, it is considered unattractive to use a rotary shutter because of the mechanical and synchronizing problems it introduces. An electronic solution is preferred.

An electronic solution of the described smear effect is obtained according to the invention. When a television pickup arrangement is used, embodiments of the invention are shown in FIGS. 7, 8, 10a, 11a and 12a. A second memory device, to be described hereinafter, is then used in addition to the first memory device which is denoted by (CM1, SS2) in FIG. 1.

In FIG. 7 (and subsequent Figures) components shown in FIG. 1 and which are important for explaining the operation and which operate in identical manner in the circuits of the several Figures are given the same reference numbers.

In FIG. 7, the terminal PT1 which carries the picture signal PS3 is connected to a (+) input of a signal combining circuit SC2. The output of the circuit SC2 is connected to an input of a signal processing circuit PC1. Signals having signal values which are lower than a threshold value are passed on attenuated by the circuit PC1 and signals having values above the threshold value are passed on substantially unattenuated.

Figure 9:
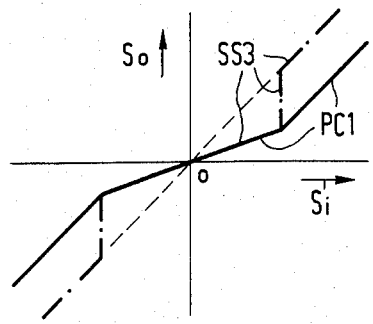
FIG. 9 is a graph showing signal transfer characteristic for the embodiments of the correction arrangements shown in FIGS. 7 and 8.

FIG. 9 shows the transfer characteristic for an input signal Si and an output signal So. PC1 denotes the characteristic which is associated with the signal processing circuit PC1 of FIG. 7.

The output of the circuit PC1 is connected to a (+) input of a signal combining circuit SC3. The output of the circuit SC3 is connected to an input of a delay device VM1, having a time delay which is substantially equal to the field period TV, and to an output terminal PT2 of the correction arrangement of FIG. 7. The output of the device VM1 is connected to a (−) input of the signal combining circuit SC2 and to a (+) input of the circuit SC3. At the input and the output of the device VM1 there are the picture signals PS4 and PS5, respectively.

For the operation of the correction arrangement shown in FIG. 7, the picture signal PS0 is processed to form the corrected picture signal PS4, present on the output terminal PT2, in the following manner. The difference between the raw signal PS3 and the delayed corrected signal PS5 is obtained in circuit SC2. If the difference is above the threshold value in the circuit PC1, it is passed on substantially unattenuated.

If not, the signal is attenuated in circuit PC1. Circuits SC2 and PC1 (comparator means) thus function to compare signals PS3 and PS5 and produce different outputs depending on the results of the comparison.

The higher the input signal value (Si in FIG. 9) the lower the degree to which the output signal (So in FIG. 9) is attenuated. For a signal whose attenuation in the circuit PC1 is so small as to be disregarded, it follows that the signal PS5 subtracted in the circuit SC2 is added again to the same extent in the circuit SC3, so that the signal PS4 corresponds to the signal PS3. This results in a bright scene portion P1, P2 or P3 (as shown for example in FIGS. 3, 4a, 4b, 5 and 6) being displayed unattenuated on display of the picture signal on the display screen D as information PD1, PD2 or PD3.

If, however, the signal PS3 has a value which is below the threshold value in the circuit PC1, then, due to the attenuation in the circuit PC1 a higher signal value is subtracted in the circuit SC2 than is added in the circuit SC3.

Circuits SC2, SC3 and PC1 (signal averaging means) thus function to average the raw signal PS3 and the delayed corrected signal PS5. It is possible to show mathematically that the degree of attenuation in the circuit PC1 is inversely proportional to the number of field periods TV over which signal averaging is effected.

The delay device VM1, the signal combining circuits SC2 and SC3 and the signal processing circuit PC1 form together a memory device (VM1, SC2, PC1, SC3) having a memory time which is at least equal to a field period TV and which further depends on the signal attenuation obtained in the circuit PC1. In this memory device, at the delay device VM1, a feedback loop (SC2, PC1, SC3) is provided between the output and the input. The feedback loop attenuates signal values in the picture signal PS3 which are below the threshold value in the circuit PC1, due to the signal averaging. These lower signal values occur at the smears −SPD1, SD2, −SPD2 and SD3 shown on the screen D in FIGS. 4a, 4b, 5 and 6, so that on display of the picture a signal PS4 instead of the picture signal PS3 the smears can be displayed attenuated.

The extent of signal attenuation and the threshold value in the circuit PC1 of FIG. 7 can be adjusted until no annoying, impermissible smears are observable on the screen D. The use of the second memory device (VM1, SC2, PC1, SC3) also reduces signal smears in scene portions moving in the horizontal direction.

Figure 8:
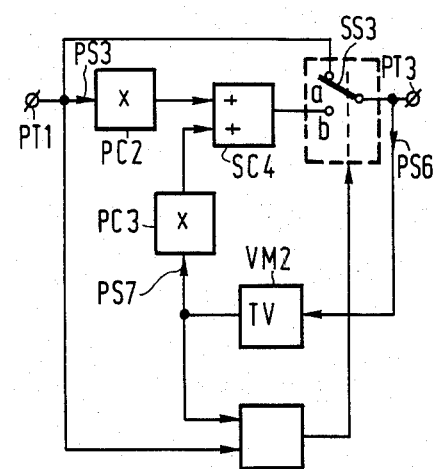
FIG. 8 schematically shows a second embodiment of an essential portion of a correction arrangement according to the invention.

FIG. 8 shows a portion of a second embodiment of the correction arrangement which is connected to the terminal PT1 of FIG. 7. The terminal PT1 is connected to a first selection contact a of a changeover switch SS3, to the input of a signal processing circuit PC2 and to an input of a movement detector MTD. The output of the circuit PC2 is connected to a (+) input of a signal combining circuit SC4, the output of which is connected to a second selection contact b of the change over switch SS3.

The switching contact of the switch SS3 is connected to an output terminal PT3 of the pickup arrangement and to the input of a delay device VM2 having a time delay which is substantially equal to one field period TV. The output of the device VM2 is connected to an input of the movement detector MTD and, via a signal processing circuit PC3, is coupled to a (+) input of the signal combining circuit SC4. The output of the movement detector MTD is connected to a switching signal input of the switch SS3. The input and the output of the device VM2 carry picture signals which are designated PS6 and PS7, respectively.

For the operation of the correction arrangement of FIG. 8, the raw signal PS3 formed from the picture signal PS0 is further processed to form the corrected picture signal PS6 present on the output terminal PT3. In the circuit PC2 the applied signal PS3 is attenuated by a first predetermined factor, while in the circuit PC3 the applied signal PS7 is attenuated by a different, second predetermined factor. The attenuation factor of the circuit PC3 is equal to unity minus the attenuation factor of the circuit PC2.

By way of example, if the attenuation factor for circuit PC2 is equal to ¼, the attenuation factor for circuit PC3 will equal ¾. When the signals PS3 and PS7 are equal, the result is that this same signal value is also present on the output of the circuit SC4. In this case the movement detector (comparator means) MTD produces a switching signal value whereby the switching contact of the switch SS3 is connected to the selection contact b. The detector MTD then indicates no movement. This also applies when the instantaneous signal values in the signals PS3 and PS7 are slightly different.

The situation changes when the instantaneous signal values of the signals PS3 and PS7 differ to a greater extent. In this situation, the indication of movement in the scene is given. The detector MTD then releases a switching signal so that the switching contact of the switch SS3 is connected to the selection contact a.

The result is that now in the region of a (bright) moving scene portion P2 or P3 (FIGS. 4a, 4b, 5 and 6) movement is detected, and that in the region of the (weak) smears SPM1, SM2, SPM2, SM3 no movement is detected. When moving scene portions are detected, the picture signal PS3 is applied directly and unaffected to the output terminal PT3. If no movement is detected the output signal of the circuit SC4 is conveyed to output PT3. The output signal of circuit SC4 is the result of a signal averaging operation performed by the delay device (delay means) VM2, the signal processing circuits PC2 and PC3 and the signal combining circuit SC4. These circuits together form a memory device (VM2, PC2, PC3, SC4, SS3) having a memory time which is at least equal to one field period TV. In this second memory device a feedback loop (PC3, SC4, SS3) is provided at the delay device VM2 between the output and the input. Mathematically it can be derived that signal averaging is performed over a number of field periods TV which is approximately proportional to the attenuation factor of the circuit PC2.

Thus, in the cited example, a signal averaging operation is performed by circuits PC2, PC3 and SC4 (signal averaging means) over approximately 4 field periods, so that the smears −SPD1, SD2, −SPD2 and SD3 (FIGS. 4a, 4b, 5 and 6) displayed on the screen D have a considerably reduced brightness and are no longer annoying.

The arrangements shown in FIGS. 7 and 8 are basically not different. The signal transfer characteristics are, however, different and the effect obtained by the use of the switch SS3 is illustrated in FIG. 9 by the characteristic SS3. It is advantageous that moving scene portions are transferred without being affected in any way (the 45° line through the zero point O in FIG. 9) in the embodiment of FIG. 8. This is not the case in the embodiment of the arrangement as shown in FIG. 7. In the FIG. 7 embodiment, some signal averaging occurs (characteristic PC1) in the event of movement.

In the embodiment shown in FIG. 8 of the second memory device (VM2, PC2, PC3, SC4, SS3), the delay device VM2 cannot only be used for signal averaging but also for movement detection by connecting the output thereof to one of the two inputs of the movement detector MTD.

The embodiments shown in FIGS. 7 and 8 of the correction arrangement are based on signal averaging where the smears occur on the display, so that the reduced smears are no longer observable to an annoying degree. The embodiments shown in FIGS. 10a, 11a and 12a of the correction arrangement according to the invention are not based on signal averaging at the smears, but on halving the picture. Each picture half has its own, associated correction.

Figure 10A:
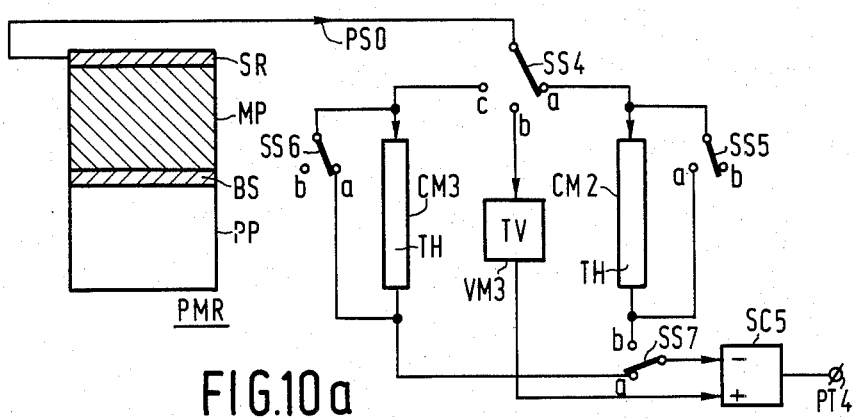
FIGS. 10a, 11a and 12a are block schematic circuit diagrams of further embodiments of a correction arrangement according to the invention.

In FIG. 10a, the output of the output shift register SR carrying the picture signal PS0 is connected to the switching contact of a changeover switch SS4. Switch SS4 has first, second and third selection contacts a, b and c.

The selection contact a of the switch SS4 is connected to the input of a delay device CM2. Delay device CM2 has a time delay equal to one line period TH. Contact a is also connected to a switching contact of a changeover switch SS5 having two selection contacts a and b. The selection contact b of the changeover switch SS5 is not interconnected, and the selection contact a is connected to the output of the delay device CM2.

In a similar manner, the selection contact c of the changeover switch SS4 is connected to a line delay device CM3 and to a switch SS6.

In combination with the respective switches SS5 and SS6, the delay devices CM2 and CM3 form first and second readable memory devices (CM2, SS5) and (CM3, SS6), respectively. Each memory device has a repetition period equal to one television line period TH.

The outputs of the delay devices CM3 and CM2 are connected to the first and second selection contacts a and b, respectively, of a changeover switch SS7. By means of its switching contact, each delay device is connected to a (−) input of a signal combining circuit SC5.

The selection contact b of the switch SS4 is connected to the input of a delay device VM3 having a time delay equal to one field period TV. The output of the device VM3 is connected to a (+) input of the circuit SC5 which has an output connected to an output terminal PT4.

Figure 10B:
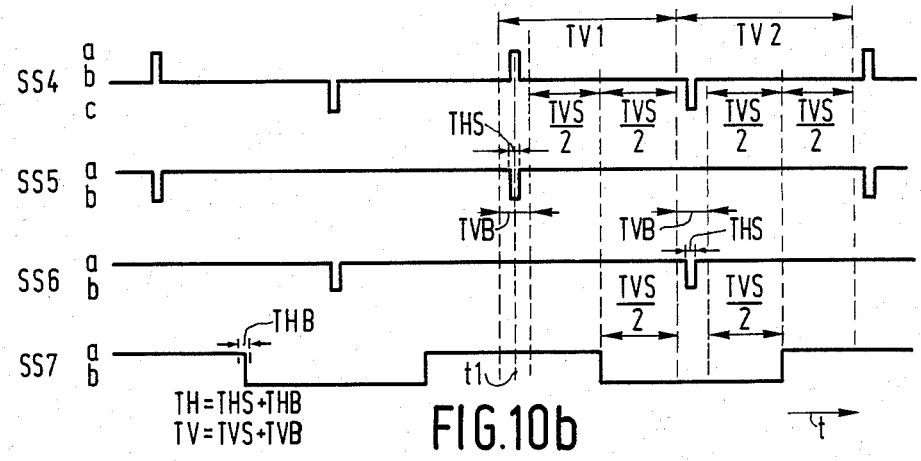
FIGS. 10b, 11b, and 12b are graphs showing as a function of time, some switching signals for the switches incorporated in the circuit diagrams of FIGS. 10a, 11a, and 12a, respectively.

The mode of operation of the correction arrangement of FIG. 10a will be described with reference to FIG. 10b. In FIG. 10b, some switching signals designated SS4, SS5, SS6 and SS7 are shown versus time t. The switching signals are associated with the switches of FIG. 10a bearing the same numbers.

The signal SS4 is shown with three signal values a, b and c, and the signals SS5, SS6 and SS7 are shown with two signal values a and b. These signal values a, b and c of FIG. 10b indicate that one of the corresponding selection contacts a, b and c of the relevant switch is connected to the switching contact thereof.

In FIG. 10b two consecutive field periods TV are denoted by TV1 and TV2. These field periods are each further divided into the field blanking period TVB and two half-field scanning periods TVS/2. In some periods of time TVB pulses having a duration equal to a line scanning period THS are shown in the signals SS4, SS5 and SS6.

The signal SS7 is a square wave. Signal edges occur in the middle of the field scanning periods TVS. In FIG. 10b, t1 denotes an instant at which the switches SS4, SS5, SS6 and SS7 are in the positions shown in FIG. 10a.

At the instant t1, the device CM2 is filled with information from the shift register SR. This information is the smear information obtained from under the black strip BS. After the device CM2 has been filled, the switch SS4 is switched immediately, or in the remainder of the field blanking period TVB to the selection contact b. Afterwards, the picture signal PS0 is applied to the field delay device VM3 for the duration of at least the next field scanning period TVS of the field period TV1. In the first half of the period TVS of the field period TV1, the switches SS6 and SS7 are in the positions shown in FIG. 10a. The field delay device VM3 then applies the picture signal PS0, delayed by one field period TV, to the circuit SC5. At the same time, the second memory device (CM3, SS6) produces at the line frequency a smear information which is not further described here.

Halfway through the period TVS of the field period TV1, the switch SS7 is switched to the selection contact b. As a result, the smear information stored at the beginning of the field period TV1 in the first memory device (CM2, SS5) is subtracted from the picture signal PS0 applied one field period TV earlier to the device VM3.

During the next field blanking period TVB of the field period TV2 the positions of the switches SS5 and SS7 are not changed. The switches SS4 and SS6 are switched for the duration of one line scanning period THS for filling the device CM3 with smear information. In the subsequent first half (TVS/2), of the field scanning period TVS of the field period TV2, the smear information is continuously obtained at the line frequency from the first memory device (CM2, SS5). At the end of this period of time TVS/2, the switch SS7 is switched again, in one line blanking period THB, to the selection contact a. The smear information is then continuously obtained at the line frequency from the second memory device (CM3, SS6).

In the foregoing cycle, the smear information is used for correction in the second half of the preceding field scanning period TVS and in the first half of the subsequent field scanning period TVS. The result thereof can be illustrated with reference to FIGS. 4a and 4b. The smear information SPM2 (FIG. 4b) is used for correction purposes in the lower half of the picture on the display screen D of FIG. 4a and in the upper half of the picture on the display screen D of FIG. 4b. From the above-described cycle it follows that the smear information SPM1 will be used for the upper half of the picture on the screen D of FIG. 4a and that a smear information SPM3 (corresponding to smear SP3 of FIG. 4b), will be used for the lower half of the picture on the screen D of FIG. 4b.

As a result, the smears $-$SPD1 and SD2 will only occur on the screen D of FIG. 4a in the upper picture half. No smear at all will be present in the lower picture half, as the smear SM2 will be corrected by the smear information SPM2. Likewise the smears $-$SPD2 and SD3 will only occur in the upper half of the screen D of FIG. 4b, while the lower half will be free of smears.

It appears that the corrections (which are different in the upper and the lower picture halves) will ultimately depend on the position and the format of the information PD. For information PD which is in the lower picture half and which moves in the horizontal direction, no smear will occur in the upper picture half. For information PF moving in the horizontal direction and being partly in the upper and the lower picture halves, smear will only occur behind the moving information PD and then only in the upper picture half.

Figure 11B:
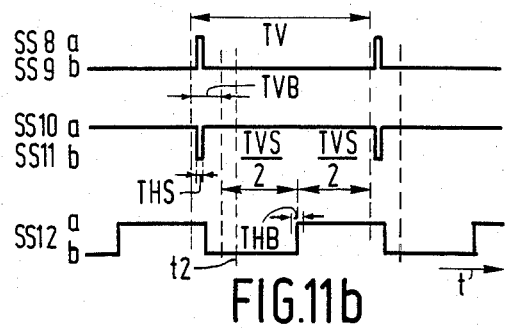
Figure 11A:
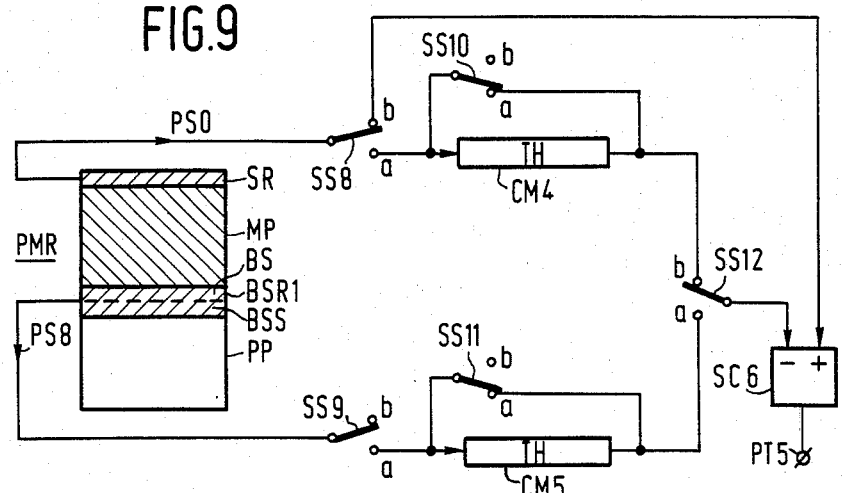

FIG. 11a is a schematic circuit diagram of another embodiment of the pickup arrangement according to the invention. In this embodiment, compared to the embodiment of FIG. 10a, the field delay device (VM3) can be dispensed with.

The picture pickup device PMR of FIG. 11a is adapted in that it not only comprises the first shift register SR but also a second shift register BSR1. Register BSR1 is part of the pickup portion PP and is located under the black strip BS. The shift registers BSR1 and SR will be operated during a line scanning period THS in the field blanking period TVB as a series-out output shift register. At all other times the register BSR1 will operate as a parallel-in, parallel-out register for the field transfer reading operation.

In a specific embodiment of the pickup arrangement, the picture pickup device PMR may be adapted further by providing next to the black strip BS a second black strip BSS on the pickup portion PP or by using a single black strip BS/BSS of double the width.

The output of the shift register SR, carrying the picture signal PS0 in operation, is connected to the switching contact of a changeover switch SS8. Likewise, the series-output of the shift register BSR1 carrying a signal PS8 is connected to the switching contact of a changeover switch SS9.

The switches SS8 and SS9 each have first and second selection contacts a and b. The second selection contact b of the switch SS8 is connected to a (+) input of a signal combining circuit SC6. The first selection contact a of the switch SS8 is connected to an input of a delay device CM4 (having a time delay equal to the line period TH) and to a switching contact of a switch SS10. A first selection contact a of the switch SS10 is connected to the output of the device CM4, while a second selection contact b is not interconnected.

The second selection contact b of the switch SS9 is not interconnected and the first selection switch a is connected to the input of a delay device CM5 and to the switching contact of a switch SS11. Delay device CM5 and switch SS11 are further interconnected in the same way as the device CM5 and the switch SS10. Thus, first and second memory dervices (CM4, SS10) and (CM5, SS11), respectively, are repeatedly readable at the line frequency.

The outputs of the devices CM5 and CM4, respectively, are connected to a first and a second selection contact a and b, respectively of a switch SS12. The switching contact of switch SS12 is connected to a ($-$) input of the signal combining circuit SC6. The output of the circuit SC6 is connected to an output terminal PT5 of the arrangement shown in FIG. 11a.

To explain the operation of the arrangement shown in FIG. 11a, FIG. 11b shows some switching signals, having values a and b, as a function of the time t. The identical switching signals SS8 and SS9 are shown as one single signal. The same applies to SS10 and SS11. These signals have an ascending and a descending pulse, respectively, with a line scanning period THS in the field blanking periods TVB. The switching signal SS12 is a square wave. Edges of signal SS12 occur in the field blanking periods TVB and in the middle of the field scanning periods TVS, with the duration of a line blanking period THB. In FIG. 11b, t2 denotes an instant at which the switches SS8 to SS10 are associated in the positions shown in FIG. 11a.

For the operation of the arrangement of FIG. 11a, it follows that in a field blanking period TVB the two memory devices (CM4, SS10) and (CM5, SS11) are filled with smear information from the respective shift registers SR and BSR1. In the first half (TVS/2) of the field scanning period TVS, the memory device (CM4, SS10) is read at the line frequency. In the second half (TVS/2), the memory device (CM5, SS11) is read. Thus, the smear picture signals which are different in the picture upper half and the picture lower half are subtracted from the picture signal PS0.

The smear information signals circulate in the memory devices (CM4, SS10) and (CM5, SS11) during the field scanning period. A refreshing refilling operation is performed in the field blanking period TVB.

In order to provide smear information in the shift register SR, the black strip BSS is provided. The width of the strip BS may be doubled to form a double strip, BS/BSS. Instead of using the double-width strip a switching mode as described in the embodiment of FIG. 10a may alternatively be used. The device VM3 is omitted in FIG. 10a, as now the smear information signals are obtained from the shift register BSR1 in advance of the signal PS0. For the sake of completeness it should be noted that the switch SS9 may be omitted. This switch SS9 functions solely to isolate the second memory device (CM5, SS11) from the picture pickup device PMR on reading at the line frequency.

Figure 12A:
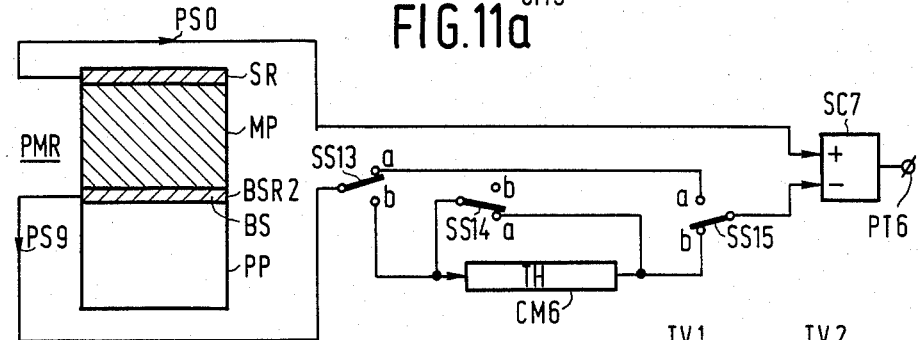

The foregoing embodiments are implicitly based on a destructive readout during the field transfer and at the shift registers SR and BSR1. FIG. 12a is a block diagram of a further embodiment of the pickup arrangement according to the invention in which a nondestructive readout is used. Shift register BSR2 can be used as a repeatedly readable memory device.

Figure 12B:
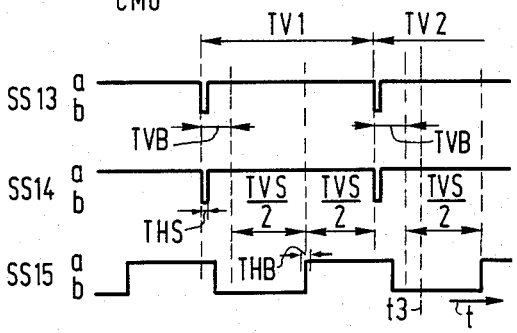

Shift register BSR2 is provided in the pickup portion PP under the masking black strip BS. The nondestructively readable shift register BSR2 is repeatedly readable as a series-out output shift register and further operates as a parallel-in, parallel-out register during field transfer. The register BSR2 is, for example, in the form of a charge injection device. To explain the operation of the arrangement shown in FIG. 12a, FIG. 12b shows some signals as a function of the time t.

In FIG. 12a the output of the first shift register SR carrying the picture signal PS0 is connected to a (+) input of a signal combining circuit SC7. The series output of the second shift register BSR2, which carries a signal PS9, is connected to a switching contact of a first changeover switch SS13 having first and second selection contacts a and b. The selection contact b of the switch SS13 is connected to the input of a signal delay device CM6 (having a time delay equal to one line period TH) and to the switching contact of a changeover switch SS14. A selection contact a of the switch SS14 is connected to the output of the device CM6 and a selection contact b is not interconnected.

The selection contact a of the switch SS13 is connected to a selection contact a of a changeover switch SS15. A selection contact b of switch SS15 is connected to the output of the device CM6. The switching contact of the switch SS15 is connected to a (−) input of the signal combining circuit SC7. The output of circuit SC7 is connected to an output terminal PT6 of the pickup arrangement shown in FIG. 12a.

The device CM6 and the switch SS14 form a first memory device (CM6, SS14) which is repeatedly readable at line frequency. The nondestructive, repeatedly readable shift register BSR2 then forms a second, similar memory device.

The switching signals for the switches SS13, SS14 and SS15 are plotted in FIG. 12b. In the field blanking periods TVB the delay device CM6 is filled, in a line scanning period THS, as then the switches SS13 and SS14 are connected to the selection contacts b. For this purpose the switching signals SS13 and SS14 of FIG. 12b have the descending pulses.

The switching signal SS15 is a square wave with edges in the field blanking period TVB and in the middle of the field scanning period TVS. The edge duration is a line blanking period THB. In FIG. 12b, t3 denotes an instant at which the switches SS13, SS14 and SS15 are positioned as shown in FIG. 12.

In the second half (TVS/2) of the field scanning period TVS of the field period TV1, the output of the register BSR2 is directly connected to the (−) input of the circuit SC7 (via the switches SS13 and SS15 which are connected to the selection contacts a). The picture signal PS0 is combined with the smear picture signal PS9 which is read nondestructively at the line frequency. At the beginning of the next field blanking period TVB, before the field transfer from the picture pickup portion PP to the memory portion MP, the device CM6 is refilled. Thereafter, in the first half (TVS/2) of the field scanning period TVS of the subsequent field period TV2, the first memory device (CM6, SS14) is repeatedly read at the line frequency and the stored smear information becomes available at the (−) input of the circuit SC7. As a result, the smear information coming from under the black strip BS is combined with the picture signal PS0 associated with the preceding and the next half (TVS/2) of the field scanning period TVS.

In the foregoing, the memory devices (CM, SS) which are repeatedly readable at line frequency are shown in the drawing as line circulating memory devices. They may alternatively be in the form of nondestructively readable registers, as shown for the register BSR2.

The embodiments shown in FIGS. 7, 8, 10a, 11a and 12a of a correction arrangement according to the invention can be advantageously implemented as circuits integrated in a semiconductor body. The correction arrangement may be provided as a separate integrated circuit or in combination with the picture pickup device PMR.

In the described correction arrangement, the connections shown may include further signal processing circuits which are not relevant for understanding the invention and which are therefore not shown.

Furthermore, the black strip BS need not connect to the masking of the memory portion MP but may alternatively be provided on the opposite side of the pickup portion PP, as described in U.S. Pat. No. 4,010,319.

The changeover switches may, if so desired, be replaced by gradually switching switches.

What is claimed is:

1. A correction arrangement for reducing smear in a raw television picture signal to produce as an output a corrected television picture signal, said arrangement comprising:

delay means having an input and an output, the input for receiving the corrected television picture signal, the output supplying an output signal which is equal to the corrected television picture signal after a delay of one field period;

comparator means for measuring the difference between the raw television picture signal and the delayed corrected television picture signal, said comparator means producing a first output signal if the measured difference exceeds a preselected threshold value and producing a second output signal if the measured difference is less than the preselected threshold value; and signal averaging means for producing a corrected output signal in response to the output of the comparator means, said corrected output signal being equal to the raw television picture signal if the output of the comparator means is the first output signal, said corrected output signal being equal to a weighted average of the raw television picture signal and the delayed corrected television picture signal if the output of the comparator means is the second output signal, said corrected output signal being the corrected television picture signal.

2. A correction arrangement as claimed in claim 1, characterized in that the signal averaging means comprises:

means for attenuating the raw television picture signal by a first preselected factor to produce an attenuated raw television picture signal;

means for attenuating the delayed corrected television picture signal by a second preselected factor to produce an attenuated delayed corrected television picture signal;

means for adding the attenuated raw television picture signal to the attenuated delayed corrected television picture signal to produce a weighted average signal; and switch means responsive to the output of the comparator means, said switch means having an output for the corrected output signal, said switch means passing the raw television picture signal to the output if the output of the comparator means exceeds the preselected threshold value, said switch means passing the weighted average signal to the output if the output of the comparator means is less than the preselected threshold value.

3. A correction arrangement as claimed in claim 2, characterized in that the first preselected attenuation factor is equal to one minus the second preselected attenuation factor.

4. A correction arrangement for reducing smear in a raw television picture signal to produce as an output a corrected television picture signal, said arrangement comprising:

first means for storing a first smear picture signal from a first television field;

second means for storing a second smear picture signal from a second television field which immediately follows the first television field;

means for subtracting the first smear picture signal from the first half of the raw television picture signal of the second television field to produce a first difference signal, said first difference signal being the first half of the corrected television picture signal; and means for subtracting the second smear picture signal from the second half of the raw television picture signal of the second television field to produce a second difference signal, said second difference signal being the second half of the corrected television picture signal.

5. A correction arrangement as claimed in claim 4, characterized in that the means for subtracting the first and second smear picture signals comprise:

switch means having first and second inputs and one output, for switchably connecting one input at a time to the output, the first input for receiving a signal from the means for storing the first smear picture signal, the second input for receiving a signal from the means for storing the second smear picture signal;

delay means having an input and an output, the input for receiving the raw television picture signal, the output supplying an output signal which is equal to the raw television picture signal after a delay of one field period; and a single subtraction circuit means having first and second inputs and an output, the first input receiving the delayed raw television picture signal, the second input receiving the output of the switch means, the subtraction circuit output providing a signal representing the output of the switch means subtracted from the raw television picture signal.

6. A correction arrangement as claimed in claim 4, characterized in that the arrangement further comprises a solid state pickup device comprising:

means for generating first and second smear picture signals for each television field;

means for reading out the first smear picture signal into the first storing means after reading out the associated television field; and means for reading out the second smear picture signal into the second storing means before reading out the associated television field.

7. A correction arrangement as claimed in claim 4, characterized in that the arrangement further comprises a solid state pickup device comprising:

means for generating a smear picture signal for each television field; and means for nondestructively reading out the smear picture signal during readout of the second half of the associated television field, said nondestructive readout means forming the second means for storing the second smear picture signal.

* * * * *